United States Patent [19]
Cormier

[11] Patent Number: 5,874,002
[45] Date of Patent: Feb. 23, 1999

[54] SEWAGE TREATMENT METHOD AND APPARATUS THEREFOR

[76] Inventor: Murphy Cormier, 2885 Hwy. 14 E., Lake Charles, La. 70605

[21] Appl. No.: 541,507

[22] Filed: Oct. 10, 1995

[51] Int. Cl.[6] ..................................................... C02F 3/120
[52] U.S. Cl. .......................... 210/626; 210/800; 210/805; 210/758
[58] Field of Search ..................................... 210/758, 620, 210/623, 626, 800, 805, 532.1, 195.4, 258, 259, 195.3

[56] References Cited

U.S. PATENT DOCUMENTS

| | | |
|---|---|---|
| 2,987,186 | 6/1961 | Burgoon et al. . |
| 3,195,727 | 7/1965 | Kibbee . |
| 3,206,032 | 9/1965 | Nottingham et al. . |
| 3,805,957 | 4/1974 | Oldham et al. . |
| 3,951,817 | 4/1976 | Snyder . |
| 4,859,325 | 8/1989 | Cormier . |
| 5,162,083 | 11/1992 | Forbes et al. . |
| 5,196,114 | 3/1993 | Burwell .................................... 210/218 |
| 5,221,470 | 6/1993 | McKinney ............................... 210/615 |
| 5,549,818 | 8/1996 | McGrew, Jr. ............................ 210/220 |

*Primary Examiner*—Neil McCarthy
*Attorney, Agent, or Firm*—William A. Bonk, III

[57] ABSTRACT

A sewage treatment apparatus including a treatment tank with a floor, walls and having an upper aperture. A hopper having a clarifier chamber is centrally disposed in the treatment tank, maintained at a predetermined height above the treatment tank floor by hopper supports. A deflector cone is centrally disposed on the floor of the treatment tank, its vertex being received in the lower aperture of the hopper. The exterior of the hopper, the deflector cone and the inner walls of the treatment tank define an annular aerator chamber, subdivided into a plurality of aerator zones. Diffusers disposed in each aerator zone introduce oxygenation of and induce flow of sewage in the treatment tank. A cover mounted over the treatment tank aperture maintains a pressurized pocket of air above the sewage for increased oxygenation of the sewage. Treated sewage passes from the aerator zones into the clarifier chamber, then into the environment. Another embodiment of the invention includes a trash trap in fluid communication with the inlet for filtering the sewage prior to treatment. A settling tank in fluid communication with the outlet is provided for filtering the sewage prior to its voidance. A method for sewage treatment is also provided.

17 Claims, 3 Drawing Sheets

SEWAGE TREATMENT METHOD AND APPARATUS THEREFOR

BACKGROUND OF THE INVENTION

1. Field of the Invention

The present invention relates to a self-contained, transportable sewage treatment plant including clarifier and aerator chambers.

2. Description of the Prior Art

Self-contained, transportable, subterraneous sewage treatment apparatuses are commonly used in many rural communities. Typically, these apparatuses are constructed from concrete or fiberglass, cast as one part or formed from a number of parts. The apparatuses usually include a housing with panels which define internal aerator chambers and clarifier chambers.

The aerator chamber is the heart of the sewage treatment plant. Once the sewage is in the aerator chamber, it is oxygenated. Introduction of oxygen into the sewage intimately mixes the organics of the sewage with the bacteria populations in the aerator chamber, creating activated sludge. The bacteria reduce the organics of the sewage. Additionally, to maximize the oxygen content of the sewage, the sewage must circulate in a manner that maintains organic solids in suspension. If the organics are permitted to settle, they are less likely to be broken down by the bacteria.

Ideally, once the sewage has been treated sufficiently, when the bacteria has broken down a target amount of the organics in solution, the activated sludge passes from the aerator chamber into the clarifier chamber. In the clarifier chamber, any remaining solids in suspension which have not yet been broken down, settle, and are returned to the aerator chamber for continued circulation and breakdown. The treated waste water flows out of the clarifier chamber and is absorbed by the environment.

The key to consistent, efficient, and reliable sewage treatment is assuring that the proper amount of oxygen is introduced into the sewage for reaction with the bacteria. The speed at which reduction of the organics in the sewage is accomplished is directly related to the amount of oxygen that can be introduced into the sewage. The rate of oxygen introduction is directly related to the configuration of, and the diffusion means used to introduce oxygen in the aerator chamber. For this reason, proper configuration of the aerator chamber and the placement of the diffusers therein is crucial. One important way to enhance the oxygen content of the sewage is to increase the flow of the sewage within the chamber, perhaps even creating turbulent flow. A second way of enhancing the oxygen content is by maintaining oxygen at a high pressure in association with the sewage, similar to carbonating a beverage. The patent literature is replete with many sewage treatment apparatuses; however, none provide for enhancing sewage flow, nor associating gas at super-ambient pressure with sewage.

For example, U.S. Pat. No. 2,987,186, issued Jun. 6, 1961, to David W. Burgoon et al., describes an apparatus for treating waste materials. The apparatus includes a tank with a vertical wall that defines side-by-side aerating and clarifying chambers. A diffuser is centrally located in the aerating chamber for introducing oxygen therein. Activated sludge from the aerating chamber passes into the clarifying chamber via a through-bore located in the vertical wall. Particulate matter remaining in solution precipitates from solution and flows back into the aerating chamber via a conduit at the bottom of the vertical wall. The conduit has an outlet proximate to the diffuser. Presumably, the venturi effect of the oxygen being introduced into the aerator chamber draws the particulate matter back into the aerating chamber. The clarified sewage passes out of the clarifying chamber by an exit conduit and into the environment.

U.S. Pat. No. 3,195,727, issued Jul. 20, 1965, to Gary W. Kibbee, describes a waste products treatment apparatus having floating solid feedback structure. The device has laterally-disposed aerating and clarifying chambers. The clarifier chamber does not extend all the way to the bottom of the tank, rather an angled wall between the aerator chamber and the clarifier chamber projects into the outer wall of the clarifying chamber, above the bottom of the tank. A passageway exists between the angled wall and the outer wall, permitting particulate matter in suspension to return to the aerating chamber. The clarifier chamber also includes a baffle for trapping large particulate matter. On the other side of the baffle is a clarified liquid basin. Clarified sludge is voided from the clarified liquid basin into the environment.

U.S. Pat. No. 3,206,032, issued Sep. 14, 1965, to Mark C. Nottingham et al., describes a sewage disposal tank. The apparatus includes a tank, defining three, serial chambers. The first chamber, an aerator chamber, includes a number of diffusers which introduce oxygen into and circulate the sludge. Activated sludge from the aeration chamber passes into the second chamber after having passed through a baffle that filters out large particulate matter. The second chamber includes a centrally-and bottomly-disposed foraminous member for screening sewage introduced into the second chamber. Some of the screened sewage is returned to a pump and urged through the diffusers along with ambient air. The second chamber is in fluid communication with the third chamber by means of a weir located near the fluid surface of the sewage. This lighter, clarified sewage is conducted into the third chamber, a holding chamber for settling. The settled sewage is voided into the environment.

U.S. Pat. No. 3,805,957, issued Apr. 23, 1974, to Robert R. Oldham et al., describes a floating solids return device. The device includes a tank having three, serial chambers. The first chamber is a primary settling tank in which raw sewage is introduced and allowed to settle. The settling chamber is in communication with the secondary chamber, or aeration chamber, by means of a weir located near the surface of the sewage. The aeration chamber includes a diffuser which introduces oxygen into the sewage. Sewage from the aerator chamber passes into the clarifying chamber by means of another weir located proximate to the sewage surface. The clarifying chamber is defined by an angled outer wall and a vertical wall separating the clarifying chamber from the aerating chamber. The angled and vertical walls intersect above the bottom of the aerating chamber. The vertical wall has a passageway between the clarifying chamber and the aerating chamber permitting solid particulate matter to be returned into the aerating chamber. Treated sewage is voided from the clarifying chamber via yet another weir.

U.S. Pat. No. 3,951,817, issued Apr. 20, 1976, to John R. Snyder, describes a sewage treatment tank and tube settler. The device includes a diffuser located in the middle of and near the sewage surface of the aerating chamber. The device also is configured such that material from the aerating chamber passes through the lower passage between the aerating chamber and the clarifying chamber, rather than through the weir located at the water surface. The device includes a weir located at the surface between the aerating chamber and the clarifying chamber for conducting sewage from the clarifying chamber into the aerating chamber.

U.S. Pat. No. 4,859,325, issued Aug. 22, 1989, to Murphy Cormier, describes a waste material treatment apparatus. The apparatus includes a tank having two, serial chambers. The first chamber is an aerating chamber including a diffuser. Introduction of oxygen into the aerating chamber, along with the baffles in the chamber, induce a predetermined circulation of the sewage. The clarifying chamber receives sewage from the aeration chamber via a passageway between the vertical wall separating the two chambers and the angled wall defining the clarification chamber. Sewage from the clarification chamber passes into the environment via a weir located near the sewage surface in the clarification chamber.

U.S. Pat. No. 5,162,083, issued Nov. 10, 1992, to Lee W. Forbes et al., describes an individual home waste water treatment plant conversion apparatus. The apparatus includes a circular tank with diffusers circumferentially dispersed about the lower periphery of the tank. A clarifier insert depends centrally from the ceiling of the tank. The clarifier insert has a horizontal cross-sectional profile that is generally oval in shape. The insert is vertically tapered from top to bottom and has a lower aperture located at a predetermined distance above the bottom of the tank. The clarifier insert defines an internal clarifier chamber and two, vaguely-defined aerator chambers surrounding the insert. Sewage is introduced into the aerator chamber and circulated by the diffuser members. Oxygenated sewage passes from the aerator chamber into the clarifier chamber through the lower aperture of the insert member. Particulate matter remaining in solution settles on the inner surface of the insert member and returns to the aerator chamber. Fluid is voided from the clarifier chamber via a weir located near the sewage surface at the top of the clarifier chamber. Although the oval shape of the insert member essentially defines two aerating chambers, the definition is not as distinct, nor as effective as the configuration used in the present invention.

Clearly, the above demonstrates a need for a sewage treatment apparatus that includes structure for augmenting sewage flow, enhancing the oxygen content thereof. The above also demonstrates the need for a sewage treatment apparatus that associates oxygen at super-ambient pressure with sewage, also enhancing oxygenation.

None of the above inventions are seen as teaching or suggesting the presently claimed sewage treatment method or apparatus therefor.

SUMMARY OF THE INVENTION

The present invention advances over the prior art by providing an apparatus including structure, and a method, for inducing flow characteristics in, and maintains air at super-ambient pressure in contact with sewage for enhanced oxygenation thereof. The invention includes a tank having a floor, four side walls, and an upper aperture. An inverted frustopyramidal-shaped hopper is centrally maintained in the tank, extending downwardly from the aperture. The hopper has an internal, frustopyramidal-shaped clarifier chamber with an upper aperture and a lower aperture.

A pyramid-shaped deflector cone is disposed on the floor of the tank beneath the lower aperture of the hopper. The exterior of the hopper, deflector cone, inner walls of the tank, and hopper supports define an aerator chamber, subdivided into four aerator zones.

An inlet introduces sewage into one of the aerator zones. Diffusers disposed in each aerator zone introduce ambient air into, and induce flow of the sewage within the aerator zones in a first predetermined direction. Oxygenated sewage passes from the aerator zones through the lower aperture of the hopper into the clarifier chamber. Particulate matter remaining in solution in the clarifier chamber settles on the interior walls of the hopper and drops back into the aerator chamber. Clarified sewage from the clarifier chamber passes into the environment via a conduit located in the center of the chamber near the sewage surface.

A cover, sealingly mounted over the tank aperture, is configured to maintain a pocket of air above the sewage at a predetermined super-ambient pressure within the tank.

Another embodiment of the invention includes a trash trap and a settling tank disposed on either side of the treatment tank. This three-tank configuration provides a sewage treatment system consonant with many sewage treatment apparatus regulations throughout the world.

The present method for sewage treatment in a sewage treatment tank includes subdividing the tank into distinct aerator zones. The method also includes introducing sewage into the tank and introducing air into the tank in a manner that induces flow of the sewage in a predetermined direction within the aerator zones. The method further includes providing a deflector cone the promotes enhanced sewage flow. The method yet also includes maintaining air at super-ambient pressure in association with the sewage contained in the tank. The method provides for voiding sewage from the tank. Finally, the method includes providing a trash trap delivering sewage into the inlet, and providing a settling tank receiving sewage from the outlet.

OBJECTS OF THE INVENTION

An object of the invention is to provide a waste treatment apparatus including an aerator chamber, subdivided into a discrete number of aerator zones which cooperate with a clarifier chamber, providing high quality effluent.

Another object of the invention is to provide a sewage treatment apparatus that maintains air at super-ambient pressure in contact with sewage for increased oxygenation thereof.

An further object of the invention is to provide a sewage treatment apparatus including a deflector cone for promoting enhanced flow of the sewage within the apparatus.

An additional object of the invention is to provide a sewage treatment apparatus including a trash trap for settling out nonorganic matter prior to sewage treatment.

Yet another object of the invention is to provide a sewage treatment apparatus including a settling tank for settling out particulate matter in sewage that was not adequately treated by the treatment tank.

Yet a further object of the invention is to provide a sewage treatment method including providing a plurality of aerator zones for enhancing efficient oxygenation of sewage.

Yet an additional object of the invention is to provide a sewage treatment method including maintaining air at super-ambient pressure in contact with sewage, enhancing efficient oxygenation thereof.

Still another object of the invention is to provide a sewage treatment method including providing a deflector cone that promotes enhanced sewage flow for enhancing efficient oxygenation of sewage.

Still a further object of the invention is to provide a sewage treatment method including providing a trash trap for settling out inorganic matter prior to sewage treatment.

Still an additional object of the invention is to provide a sewage treatment method including providing a settling tank for settling out particulate matter not adequately broken down during sewage treatment.

A final object of the invention is to provide improved elements and arrangements thereof in an apparatus, and improved steps and arrangements thereof in a method for the purposes described which are inexpensive, dependable, and accomplish the intended purposes of the invention.

These and other objects, features, and advantages of this invention will become apparent to those skilled in the art from the following description, claims, and accompanying drawings.

DETAILED DESCRIPTION OF THE INVENTION

SEWAGE TREATMENT APPARATUS

Figure 1:
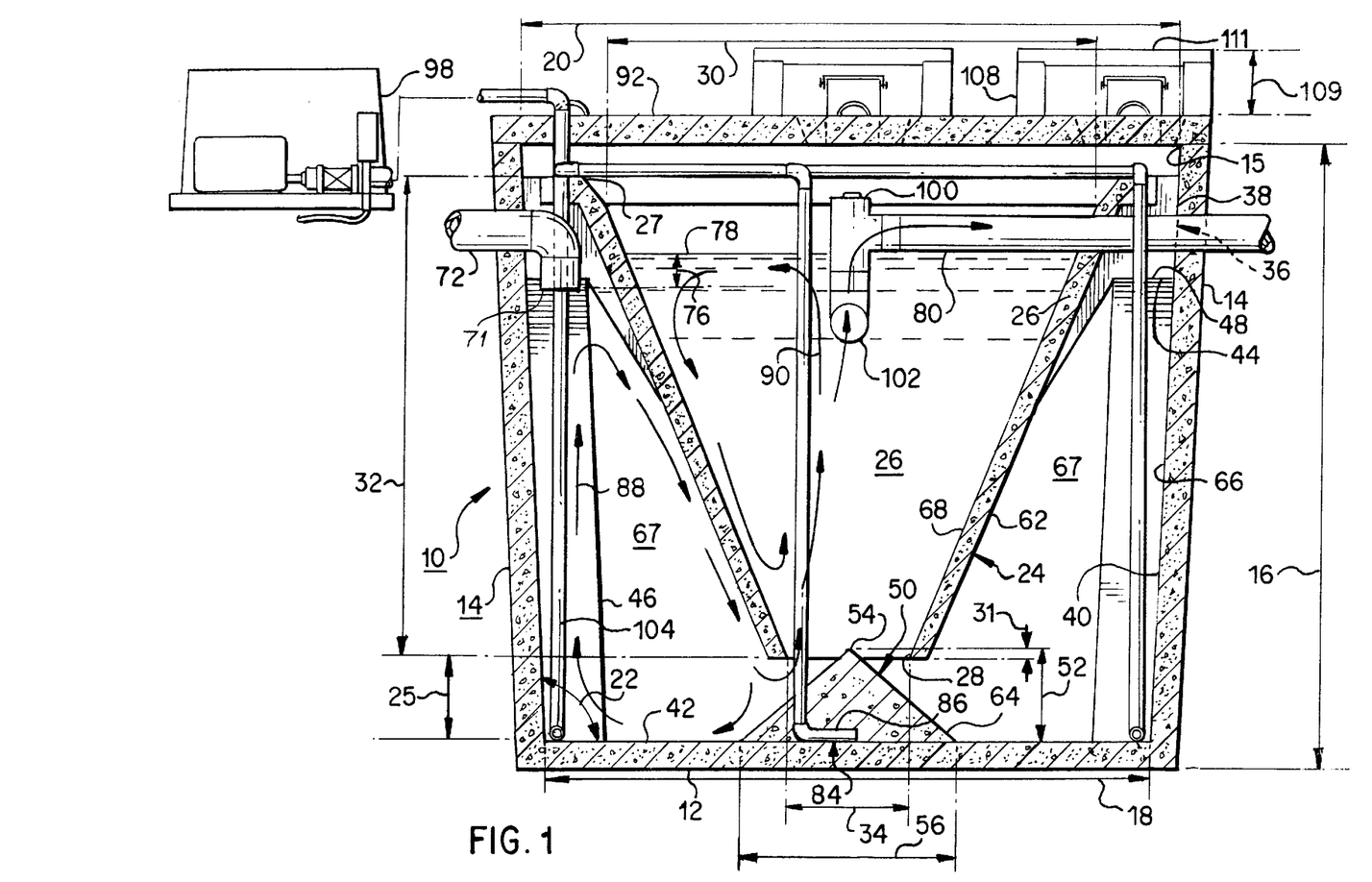
FIG. 1 is a vertical, cross-sectional detail view of the invention, taken along line 1—1 in FIG. 2.

Referring to FIG. 1, the invention includes a treatment tank 10 with a floor 12, side walls 14 and an upper aperture 15. Preferably, the floor 12 and side walls 14 are integrally molded from concrete with three-inch thickness. The treatment tank 10 has an interior inverted, frustopyramidal shape which promotes superior flow of sewage therein, discussed infra. The unique interior shape also eases manufacturing by providing a draft angle 22 that facilitates removal of the treatment tank 10 from a mold.

In the interest of material preservation, the exterior of the treatment tank 10 mirrors the inverted, frustopyramidal interior shape. The outward cant of the walls 14, however, should be minimized in order to accommodate adjacent tanks in contact and fluid communication with the treatment tank 10, discussed infra.

A hopper 24 is received in the upper aperture 15 of the tank 10. The upper portion 36 of the hopper 24 has peripheral faces 38 that mate with the inner surfaces 40 of the walls 14 of the tank 10. The peripheral faces 38 are dimensioned and configured to frictionally engage with the tank 10 such that the hopper 24 is maintained at a predetermined height 25 above the inner surface 42 of the floor 12 of the tank 10. The peripheral faces 38 include notches 106, as best seen on FIG. 2, to discourage air pockets from forming between the tank 10 and hopper 24.

In addition to hopper-tank frictional interengagement for maintaining the position of the hopper 24 in the tank 10, or alternatively, the upper portion 36 of the hopper 24 includes mounting pads 44 that extend into each corner of the treatment tank 10. The mounting pads 44 seat on the mounting pads 48 of hopper supports 46, discussed infra, or structures (not shown) incorporated in the tank 10.

The lower portion of the hopper 24, preferably, has outer surfaces 62 that complement the inner surfaces 40 of the walls 14 of the tank 10 to promote the preferred sewage flow therein. To this end, the hopper 24 is shown having a generally inverted, frustopyramidal-shaped, vertical profile. Cross sections taken along any horizontal section of the lower portion of the hopper 24 have a square shape. The cant of the outer surfaces 62 of the hopper 24 and the inner surfaces 40 of the walls 14 of the tank 10 need not be similar. However, the surfaces 40 and 62 cooperate to promote flow therebetween in a vertical fashion, as opposed to encouraging circulation around the tank 10.

The hopper 24 has an inner clarifier chamber 26 with an upper aperture 27 and a lower aperture 28. Again, in the interest of material preservation, the shape of the clarifier chamber 26 mirrors the exterior, inverted, frustopyramidal shape of the hopper 24. The narrow, throat-like lower aperture 28 minimizes fluid flow within the clarifier chamber 26, thus encouraging the settling out of particulate matter onto and down the inner walls 68 of the clarifier chamber 26 and out of the lower aperture 28.

Figure 2:
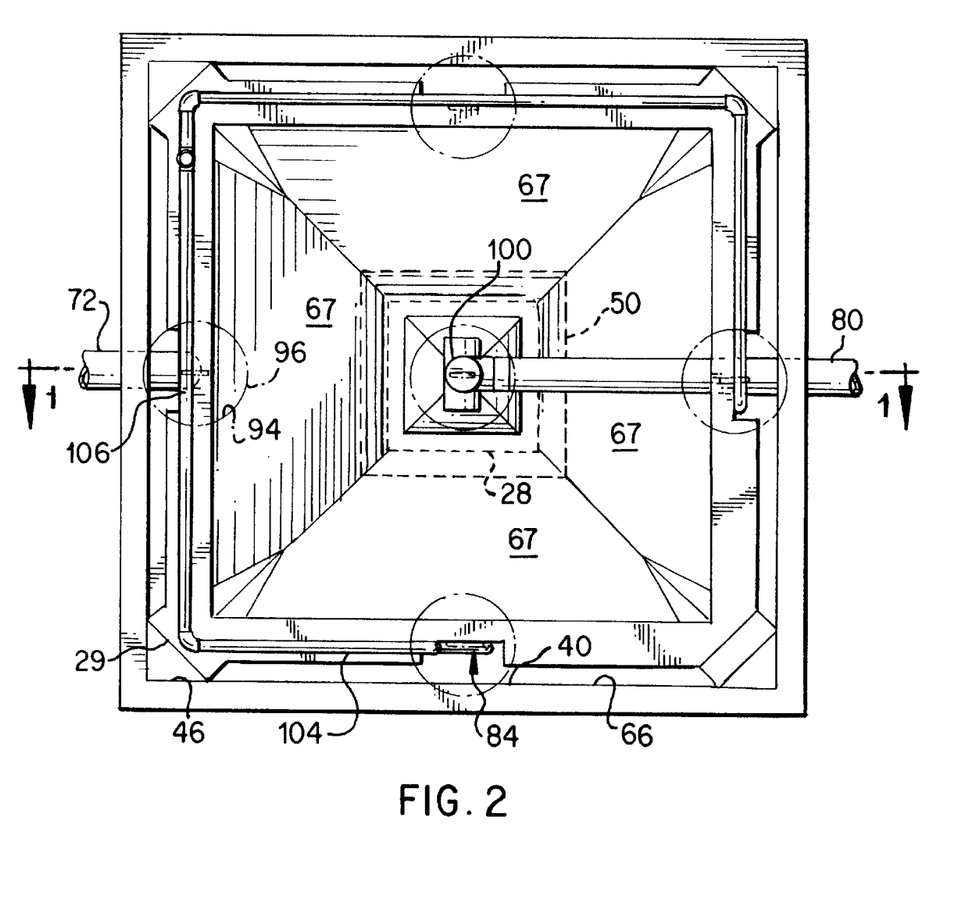
FIG. 2 is a top plan view of the invention showing the cover thereof in ghost lines.

Hopper supports 46, mentioned above, are disposed in each corner of the treatment tank 10. Each hopper support 46, as best seen in FIG. 2, has a cross-sectional profile having an isosceles-triangle shape with a base 29. Each base 29 is disposed inwardly toward the center of the tank 10. Ideally, the hopper supports 46 are primarily responsible for maintaining the hopper 24 such that the aperture 28 is properly situated at the predetermined height 25 above the floor 12 of the tank 10.

A deflector cone 50 is mounted on the floor 12 of the tank 10, beneath the aperture 28 of the hopper 24. The deflector cone 50 should be centrally located on the floor 12 of the tank 10 to encourage uniform flow characteristics throughout the tank 10. As with the surfaces 40 and 62 of the walls 14 and hopper 24, respectively, the surfaces 64 of the deflector cone 50 cooperate to promote vertical flow, rather than flow around the tank 10. To restrict flow in and out of the aperture 28 of the hopper 24, the vertex 54 of the deflector cone 50 is received into the center of the lower aperture 28 of the hopper 24 by a predetermined amount 31.

Referring also to FIG. 2, the inner surface 40 and 42 of the walls 14 and floor 12, respectively, the outer surfaces 62 of the hopper 24 and the outer surfaces 64 of the deflector cone define an annular aerator chamber 66, subdivided into four aerator zones 67. Providing four distinct aerator zones 67 significantly improves the efficient oxygenation of sewage within the tank 10. Oxygenation occurs more rapidly and efficiently in smaller volumes of sewage. Additionally, four aeration zones insures that no activated sludge accumulates on the bottom of the aerator chamber 66, minimizing the total suspended solids discharged into the environment.

Referring again to FIG. 1, an example of the preferred embodiment of the invention includes a tank 10 having an overall exterior height 16 that is approximately 66 inches, a lower interior width 18 of approximately 64.5 inches, and an upper interior width 20 of approximately 70.5 inches. An exemplary hopper 24 has an overall height 32 that is approximately 51 inches, an upper aperture interior width 30 of approximately 56 inches and a lower aperture interior width 34 of approximately 13 inches. The ideal example of a hopper support 46 stands approximately 52 inches tall and a cross-sectional base 29 measuring approximately seven inches. The exemplary predetermined height 25 of the lower aperture 28 of the hopper 24 above the inner surface 42 of the floor 12 is approximately nine inches. The preferred example of a deflector cone 50 has an overall height 52 of approximately ten inches and a width 56 of approximately 23 inches. The preferred example of the predetermined amount 31 that the vertex 54 extends into the aperture 28 of the hopper 24 is approximately one inch. This preferred configuration provides for the treatment of 500–1500 gallons of sewage per day, depending on the amount of air introduced into the tank 10.

Diffusers 84 are disposed in each aerator zone 67. The diffusers 84 each include foraminous members 86 proximate to the inner surface of the floor 12 and the inner surface 40 of the walls 14 of the treatment tank 10. The foraminous members 86 receive pressurized air and create large quantities of small air bubbles (not shown). The air bubbles flow upward and induce the sewage in the treatment tank 10 to circulate in a first predetermined direction 88. The sewage circulates up the wall 14 of the tank and then the down the outer surface 62 of the hopper 24. Some of the sewage flows against the deflector cone 50 and up through the aperture 28 of the hopper 24. The bulk of the sewage is deflected by the deflector cone 50 and encouraged to continue to circulate in the first predetermined direction 88.

Once in the clarifier chamber 26, the fluid circulates slowly in a second preferred direction 90. While circulating in the clarifier chamber 26, particulate matter precipitates from the solution and falls against the inner surface 68 of the hopper 24. The particulate matter slides down the inner surface 68, through the aperture 28, and back into one of the aerator zones 67. Once back in an aerator zone 67, particulate matter recirculates in the first predetermined direction 88 for further breakdown by the bacterial agents in the aerator zones 67.

Referring also to FIG. 2, a cover 92 is dimensioned and configured to sealingly seat on and close the aperture 15 of the treatment tank 10. When the cover 92 is in place, the apparatus is installable in the ground nearby the building the apparatus is servicing. The cover 92 prevents the apparatus from becoming clogged with dirt. The cover 92 has an access hole 94 superposed over each diffuser 84 for periodic servicing. An access cap 96 is sealingly received in each access hole 94. The access hole 94 and access cap 96 threadingly interengage. The cover 92 and access cap 96 discourage gas from escaping from the treatment tank 10.

The cover 92 includes conventional risers 108 disposed over each access hole 94. Each riser 108 provides for access to the access holes 94 without having to unearth the entire cover 92 to do so. Each riser 108 has a height 109 above the cover 92 suitable to permit servicing the apparatus, while at the same time, rendering the apparatus virtually unnoticeable. The riser 108 includes a cap 111 that, when the apparatus is installed, is substantially flush with the ground. The cap 111 is mounted on the riser 108 by known means.

At least one inlet 72 extends through a wall 14 of the tank 10 and introduces sewage into at least one of the aerator zones 67. The inlet 72 has an aperture 71 that is bent downwardly, terminating below the sewage level 78 in the treatment tank 10. If the aperture 71 were not provided in such a manner, gas pressure within the pocket defined by the cover 92, walls 14 and sewage surface would be in equilibrium with the ambient atmosphere as noxious gases vented back into the building the apparatus services.

At least one outlet 80 is centrally disposed in the upper portion 36 of the hopper 24 and voids sewage from the clarifier chamber 26. Since the inlet 72 initiates sewage treatment, and the outlet 80 terminates treatment, relative placement of the two conduits controls apparatus performance. The vertical relationship, "distance 76" hereinafter, in particular, between the inlet 72 and outlet 80 is critical to one of the novel features of the present invention.

One of the main advances of the present invention is associating air at super-ambient pressure with the sewage in the tank 10. Maintaining a pocket of air at super-ambient pressure in association with the sewage forces more air into the sewage, enhancing the oxygenation of the sewage. Sewage having enhanced oxygenation can better sustain larger bacteria populations that can more swiftly break down the organics contained in the sewage. In order to pressurize the air pocket above the sewage surface, the inlet 72 must be maintained above the outlet 80 by a predetermined amount, or distance 76. Sewage delivered by the inlet 72 at a superior height relative to the outlet 80 imparts pressure against sewage in the tank 10 proportional to this distance 76, as taught by Bernoulli's law.[1] A large distance 76 results in greater pressure being exerted by the sewage column against the sewage in the tank 10. This pressure urges the sewage level 78 in the tank 10 to rise, thereby compressing gas thereabove. The sewage line 78 levels out at the height at which the outlet 80 is disposed, therefore may only compress the gas in the pocket by a predetermined amount.

[1] Pressure=(fluid density)*(fluid column horizontal area)*(column height)

The preferred distance 76 between the inlet 72 and the outlet 80 is approximately two inches. This two-inch drop creates a pocket of air having a pressure between 0.20 and 0.25 pounds per square inch (psi). Significant experimentation has shown that pressures exceeding this pressure band impair the treatment capability of the apparatus. First, the sewage in the treatment tank 10 does not flow as well as at lower pressures. Second, the air pump 98, discussed infra, that delivers air to the diffusers 84 tends to labor unproductively. Third, despite increased pressures, the diffusers 84 are not able to generate significantly more bubbles to increase the flow of the fluid.

In order to sustain the pocket of air at the ideal pressure, the diffusers 84 each receive ambient air at 2.5–3.0 psi which is introduced into the aerator zones 67 at a rate of 2.5–3.0 cubic feet per minute. The air not absorbed by the sewage, bubbles out of the sewage and is trapped in the pocket thereabove.

Ordinarily, sewage passes from the clarifier chamber 26 through the lower aperture 102 of the outlet 80. The sewage is oxygenated such that as the sewage passes out through the outlet 80, air absorbed therein is removed at a steady rate, maintaining the desired 0.20–0.25 psi air pocket. In the event the diffusers 84 introduce more than the desired amount of air into the aerator zone 67, or the inlet 72 or outlet 80 do not convey the sewage as intended, the invention provides a relief valve 100 mounted on the outlet 80. The relief valve 100 opens and vents to the atmosphere air at pressure exceeding 0.20–0.25 psi through the outlet 80.

Preferably, the air pump 98 is selected from models manufactured by Troy Air Blower, specifically Models H-500, H-1000, or H-1500. The air pump 98 supplies air to the diffuser 52 via conventional fluid conduit 104. As best seen in FIG. 2, the hopper 24 has notches 106 that accommodate the conduit 104. The notches 106 also provide access to the diffusers 84 for periodic servicing as required.

Figure 3:
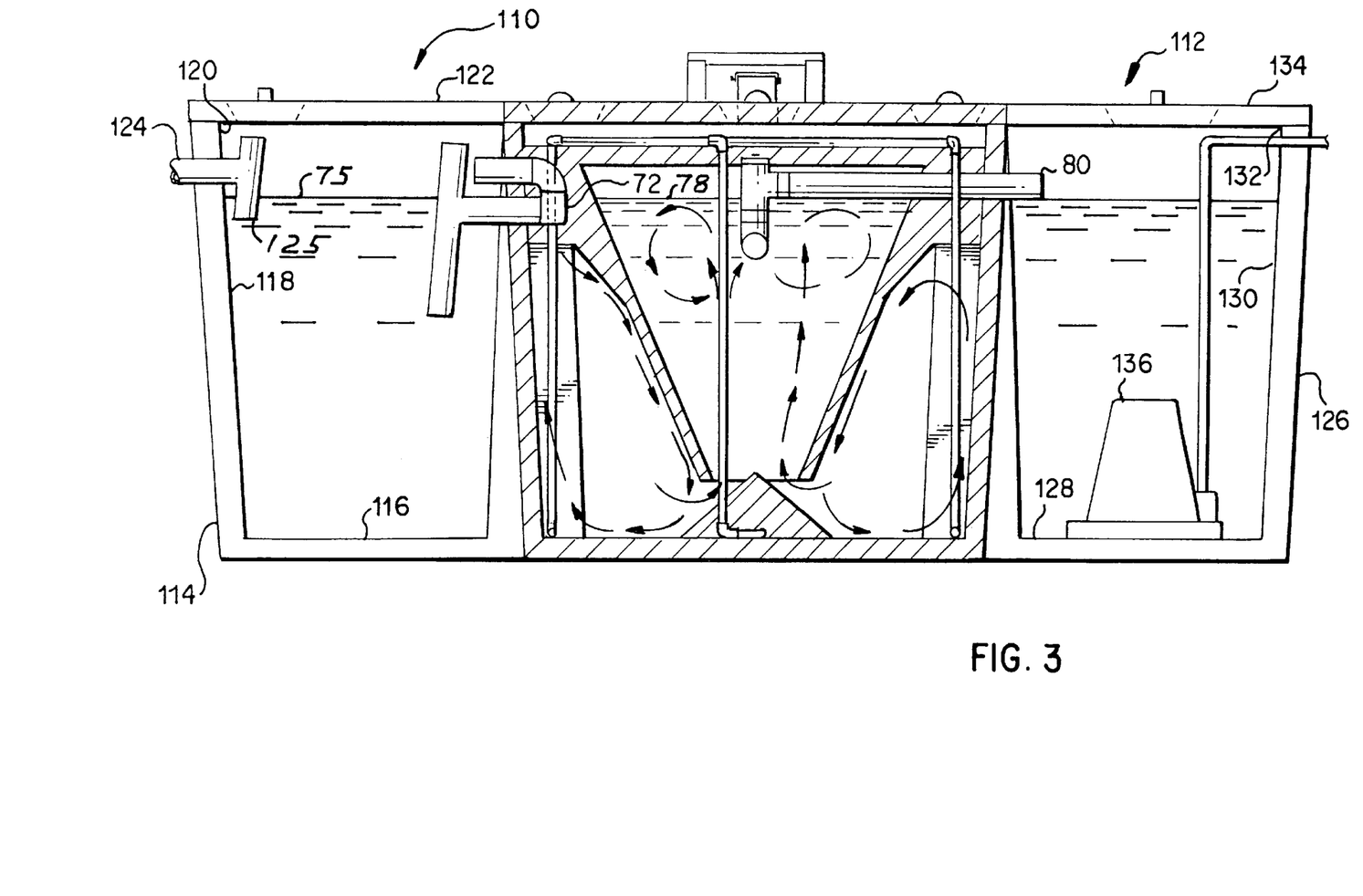
FIG. 3 is a vertical, cross-sectional detail view of another embodiment of the invention including a trash trap and a settling tank disposed on either side of the treatment tank.

Referring to FIG. 3, another embodiment of the invention is shown. In addition to a treatment tank 10 as described above, the embodiment also includes a conventional trash trap 110 and settling tank 112.

The trash trap 110 includes a conventional tank 114 with a floor 116, walls 118, an upper aperture 120, and a cover 122. Sewage is introduced into the tank 114 via conventional conduit 124. Once inside the tank 114, the inorganic materials, such as rags, settle out. The settled sewage then passes into the inlet 72. Unlike in the original embodiment, the inlet 73 need not have a downwardly-oriented aperture. The sewage line 75 in the trash trap 110 is substantially equal to the sewage line 78 in the treatment tank 10. The height at which the trash trap sewage line 75 is maintained determines the height of the sewage line 78 in the treatment tank 10. So long as the inlet 73 is maintained below the sewage line 75, its configuration does not affect the sewage line 78 in the treatment tank 10 or air pocket pressure. The sewage level 75 in the trash trap 110 depends on the location of the inlet 124. More specifically, the aperture 125 of the inlet 124 must be configured to define the 2-inch drop between it and the outlet 80, as described above.

Once the sewage has been processed in the treatment tank, as described above, the sewage passes into the settling tank 112 via the outlet 80. The settling tank 112 also includes a conventional tank 126 with a floor 128, walls 130, an upper aperture 132, and a cover 134. Sewage introduced into the settling tank 112 is held for a predetermined time, allowing for particulate matter to settle out, prior to introducing the effluent into the environment. A pump 136 is provided for removing the sewage from the settling tank 112.

SEWAGE TREATMENT METHOD

The preferred apparatus for carrying out the present method is described in detail above. In the interest of brevity and simplicity, the following description of the present method highlights only the major features thereof.

The present method is intended for sewage treatment in a treatment tank. The method includes providing a hopper in the treatment tank having an interior clarifier chamber. The exterior of the hopper and the interior walls of the tank define an annular aerator chamber, subdivided into four, distinct aerator zones. Providing four aerator zones facilitates more efficient oxygenation of sewage within the tank. Oxygenation occurs more rapidly and efficiently in smaller volumes of sewage.

The method also includes introducing sewage and air into the tank. The air is diffused into the sewage in a manner that induces flow of the sewage in a predetermined direction. Inducing the preferred flow is effectuated by disposing the diffusers at the periphery of the aerator zones. Bubbles of air disbursed by the diffusers urge the sewage to flow up along the outer walls of the aerator zones, then turn and flow along the outer surface of the hopper toward the floor of the tank.

The method further includes providing a deflector cone in the tank, further defining the aerator zones. Providing a deflector cone promotes flow within the treatment apparatus within the aerator zones as well as between the aerator zones and the clarifier chamber.

The method additionally includes maintaining air at super-ambient pressure in association with the sewage contained in the tank. Maintenance of air at super-ambient pressure increases the rate at which the sewage absorbs oxygen. Increased oxygen absorption intensifies bacterial growth and permits swifter breakdown of the organic components of the sewage.

The method yet also includes voiding sewage from the tank into the environment. Consistent with the step of maintaining air at super-ambient pressure in contact with the sewage, the preferred outlet is vertically inferior to the inlet. Sewage delivered by the inlet at a superior height relative to the outlet imparts pressure against sewage in the tank proportional to the height. This pressure urges the sewage level in the tank to rise, thereby compressing gas thereabove. The sewage line levels out at the height at which the outlet is disposed, therefore may only compress the gas in the pocket by a predetermined amount.

Another embodiment of the inventive method includes providing a trash trap in fluid communication with the inlet prior to conveying sewage into the treatment tank. The trash trap provides for settling out inorganic matter from the sewage prior to its deliverance into the treatment tank. This preliminary filtration discourages clogging and reduces the amount of maintenance that otherwise might be necessary for appropriate sewage treatment.

An additional embodiment of the inventive method includes providing a settling tank in fluid communication with the treatment tank. A settling tank provides for particulate matter that was not broken down in the treatment tank to precipitate from the sewage solution prior to its discharge into the environment.

The present invention is not limited to the embodiments described above, but is susceptible of other implementations. The appended claims should be construed broadly, consistent with the spirit of the invention, and should not be limited to their literal terms.

I claim:

1. A method for treating waste in a sewage treatment tank including a floor and walls and having an upper aperture, and a hopper disposed in the treatment tank said hopper having walls and at least one clarifier chamber, said hopper and said treatment tank defining an aerator chamber, said method comprising the steps of:

dividing said aerator chamber into a plurality of aerator zones each of said plurality of aerator zones being defined by one of said walls of said tank cooperating with one of said walls of said hopper;

introducing sewage into at least one of said aerator zones; and diffusing air into said at least one of said aerator zones, thereby promoting flow of the sewage in a first direction within said at least one of said aerator zones.

2. A method for treating waste as recited in claim 1, including maintaining air at a predetermined pressure in association with the sewage contained in the treatment tank.

3. A method for treating waste as recited in claim 2, wherein said step of introducing sewage into at least one of the aerator zones is performed with an inlet and said step of voiding sewage from at least one of said clarifier chambers includes providing an outlet receiving the sewage;

said step of maintaining air at super-ambient pressure in association with the sewage contained in the treatment tank including the steps of:

maintaining said outlet vertically superior to said inlet; and providing a cover dimensioned and configured to sealingly mate with the treatment tank for defining a pocket for trapping air;

whereby sewage delivered by the inlet imparts pressure on sewage in the tank and urges the sewage line to rise, thereby compressing air into said pocket at said predetermined pressure.

4. A method for treating waste as recited in claim 2, said predetermined pressure being between 0.20 and 0.25 pounds per square inch.

5. A method for treating waste as recited in claim 1, said aerator chamber being divided into four aerator zones.

6. A method for treating waste as recited in claim 1, including defining said aerator zones further with at least one deflector cone disposed in said treatment tank.

7. A method for treating waste as recited in claim 6, including promoting flow between said clarifier chambers and said aerator chambers by said hopper having a lower aperture between at least one of said clarifier chambers and said aerator chambers, said aperture being disposed at a predetermined distance above said floor;

one of said deflector cones having a base resting on said floor and an vertex pointing upwardly;

said lower aperture receiving said vertex of said deflector cone.

8. A method for treating waste as recited in claim 6, at least one of said deflector cones being pyramid-shaped with a like number of faces as aerator zones.

9. A method for treating waste as recited in claim 1, said floor and walls of said treatment tank defining an interior, inverted, frustopyramidal-shaped volume.

10. A method for treating waste as recited in claim 1, said hopper having an exterior, inverted, frustopyramidal shape.

11. A method for treating waste as recited in claim 1, at least one of said clarifier chambers having an inverted, frustopyramidal shape.

12. A method for treating waste as recited in claim 1, including settling sewage prior to its treatment in the treatment tank by providing a trash trap in fluid communication with the inlet, said trash trap holding the sewage and receiving settled, inorganic matter therefrom prior to its introduction into said treatment tank.

13. A method for treating waste as recited in claim 1, including settling the sewage after treatment in the treatment tank by providing a settling tank in fluid communication with the outlet, said settling tank holding the sewage and receiving settled particulate matter therefrom prior to its voidance.

14. A method for treating waste as recited in claim 2, including the step of voiding sewage from at least one of the clarifier chambers, the sewage having been received from the aerator chamber.

15. A method for treating waste in a sewage treatment tank comprising the steps of:

introducing sewage into the treatment tank with an inlet;

voiding sewage from the treatment to with an outlet; and maintaining air at a predetermined pressure it association with the sewage contained in the treatment tank including the steps of:

maintaining said outlet vertically superior to said inlet; and providing a cover dimensional and configured to sealingly mate with the treatment tank, defining a pocket trapping air;

whereby sewage delivered by said inlet imparts pressure on sewage in the treatment tank and urges a sewage line to rise, thereby compressing air into said pocket at said predetermined pressure.

16. A method for treating waste as recited in claim 15, said predetermined pressure being between 0.20 and 0.25 pounds per square inch.

17. A method for treating waste as recited in claim 1, each of said plurality of aerator zones further being defined by a hopper support.

\* \* \* \* \*

UNITED STATES PATENT AND TRADEMARK OFFICE
CERTIFICATE OF CORRECTION

PATENT NO : 5,874,002
DATED : February 23, 1999
INVENTOR(S) : Murphy Cormier

It is certified that error appears in the above-identified patent and that said Letters Patent is hereby corrected as shown below:

column 12, line 1, after "treatment," delete --to--; and column 12, line 2, delete "it," and insert --in--; and Fig. 1 should not show second occurrence of reference character 26, incorrectly denoting the inner wall of the clarifer chamber.

Signed and Sealed this

Eleventh Day of April, 2000

*Attest:*

Q. TODD DICKINSON

*Attesting Officer*     *Director of Patents and Trademarks*